UNITED STATES PATENT OFFICE.

THOMAS ROYLE, OF LONDON, ENGLAND.

PROCESS OF PURIFYING WATER.

SPECIFICATION forming part of Letters Patent No. 567,919, dated September 15, 1896.

Application filed April 3, 1896. Serial No. 586,115. (No specimens.)

*To all whom it may concern:*

Be it known that I, THOMAS ROYLE, analytical and consulting chemist, a subject of the Queen of Great Britain and Ireland, residing at Dalton House, 329 Upton Lane, London, England, have invented certain Improvements in Purifying Water, of which the following is a specification.

This invention relates to the purification of water for the purposes of drinking and technical uses for the supply of pure water to towns, ships, camps, forts, for the clarification and purification of effluent waters of towns and factories and the like.

According to this invention the water is treated, first, with a manganate or a permanganate (or a mixture thereof) of an alkaline metal in solution, and the resulting mixture is then treated with manganous chlorid or other manganous salt in solution.

The following example will explain the manner in which this invention can be carried into effect: To ten thousand parts of the water to be treated three parts of a five-per-cent. solution of permanganate of potassium are added, and when this mixture is completed three parts of a ten-per-cent. solution of manganous chlorid are added. When the whole is thoroughly and sufficiently mixed, it is filtered, or the mixture may be allowed to rest some time in order that molecular aggregation may take place, whereby the filtration is rendered more expeditious. The reaction which takes place may be expressed by the following formula:

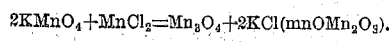
$2KMnO_4 + MnCl_2 = Mn_3O_4 + 2KCl(mnOMn_2O_3).$

When treating the waters of rivers, springs, or the like or effluents of towns or factories, it is sufficient if the solution of the manganate or permanganate of an alkaline metal be added so as to produce a mixture of a crimson color, and then to add a like quantity of the ten-per-cent. solution of manganous chlorid.

In cases where it is desirable to soften the water the necessary quantity of lime may be added during or at the end of the process. I have found that two parts of lime to ten thousand parts of the water under treatment are usually sufficient. The addition of lime may also be advisable when dealing with water derived from forest or peat districts.

In the claims I wish the term "manganate" to be understood as including a manganate, a permanganate, or a mixture thereof.

I claim as my invention—

1. The purification of water by treating it with a manganate of an alkaline metal and afterward with a manganous salt.

2. The purification of water by treating it with a manganate of an alkaline metal and afterward with manganous chlorid.

3. The purification of water by treating it with a manganate of an alkaline metal and then with a manganous salt and lime being added, substantially as set forth.

In testimony whereof I have signed my name to this specification in the presence of two subscribing witnesses.

THOMAS ROYLE.

Witnesses:
CHAS. MILLS,
L. WALTER.